Jan. 12, 1960      A. M. WOLDIN      2,920,739
CONTAINER OR ARTICLE DIVIDER
Filed May 2, 1958      3 Sheets-Sheet 1
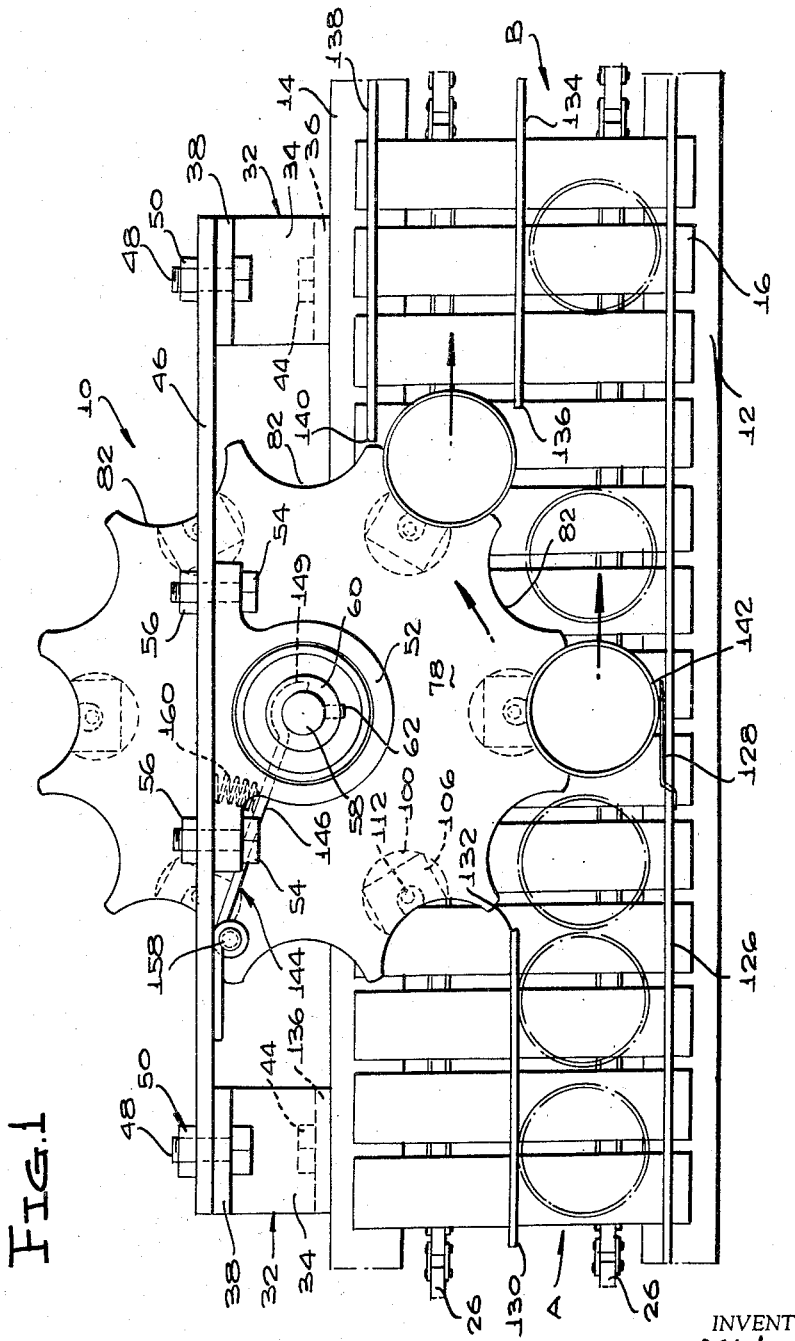
INVENTOR.
ALFRED M. WOLDIN
BY
McMorrow, Berman & Davidson
ATTORNEYS Jan. 12, 1960 — A. M. WOLDIN — 2,920,739
CONTAINER OR ARTICLE DIVIDER
Filed May 2, 1958 — 3 Sheets-Sheet 2
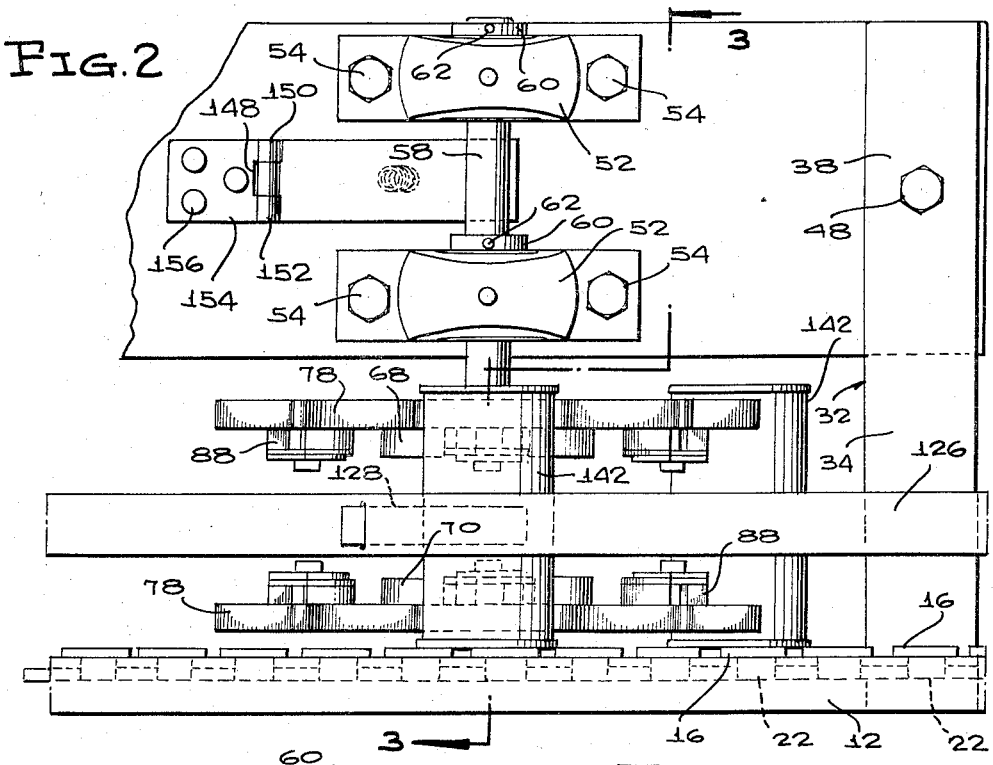
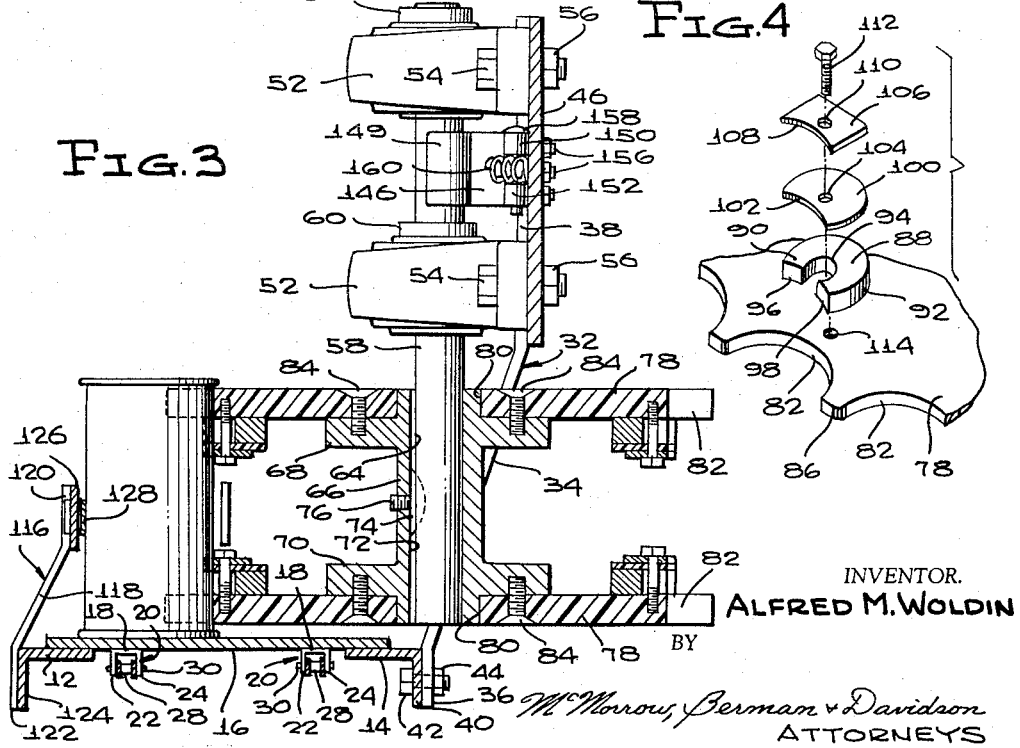
INVENTOR.
ALFRED M. WOLDIN
BY McMorrow, Berman & Davidson
ATTORNEYS Jan. 12, 1960 A. M. WOLDIN 2,920,739
CONTAINER OR ARTICLE DIVIDER
Filed May 2, 1958 3 Sheets-Sheet 3
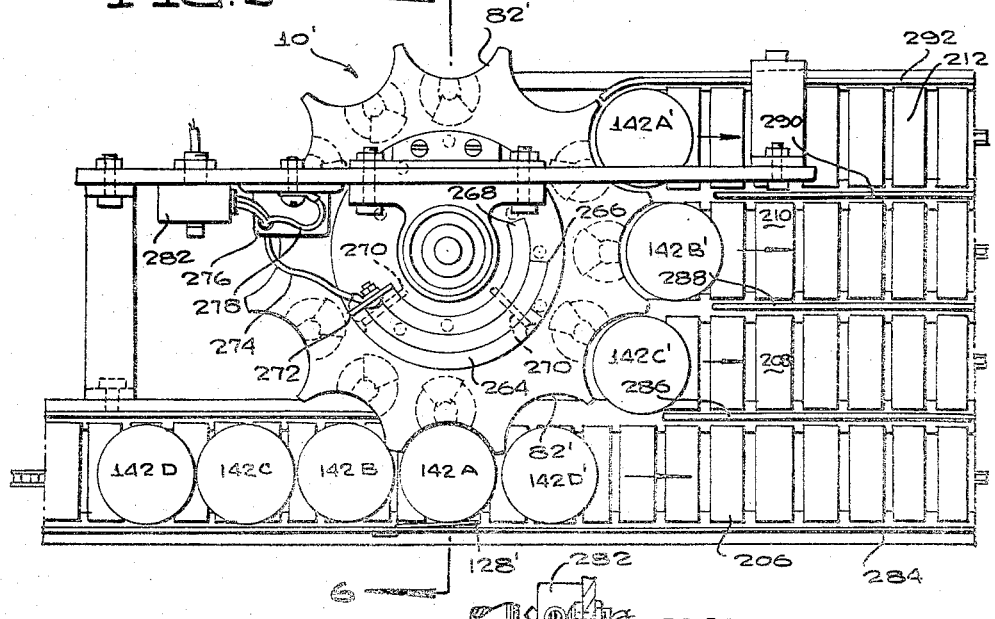
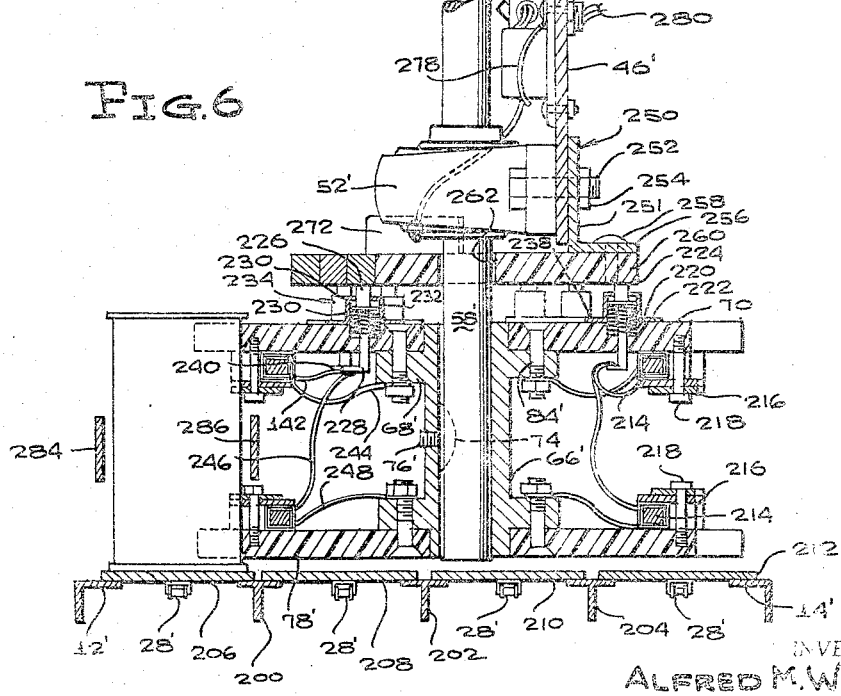
INVENTOR
ALFRED M. WOLDIN
BY
McMorrow, Berman & Davidson
ATTORNEYS

United States Patent Office 2,920,739
Patented Jan. 12, 1960

2,920,739

CONTAINER OR ARTICLE DIVIDER

Alfred M. Woldin, Trenton, N.J.

Application May 2, 1958, Serial No. 732,691

5 Claims. (Cl. 198—31)

This invention relates to conveying apparatus and, more specifically, the invention pertains to conveyor apparatus together with means for systematically diverting articles from a first predetermined path of travel for direction in a second predetermined path of travel.

One of the primary objects of this invention is to provide in an article conveyor line a control device for selectively diverting articles received from a single conveyor runway to two or more conveyor runways.

Another object of this invention is to provide a rotary turret device for dividing or diverting articles from a single conveyor runway to a plurality of conveyor runways.

A further object of this invention is to provide an article conveyor line control device which includes a magnetic rotary turret for selectively diverting articles or containers from a single conveyor runway to a plurality of runways.

Still another object of this invention is to provide an article conveyor line control device which includes a magnetic rotary turret for selectively diverting the conveyed articles from a single conveyor runway to a plurality of runways in a pre-selected ratio.

A still further object of this invention is to provide an article conveyor line control device of the magnetic rotary turret type generally referred to above, wherein the location of the magnets may be selectively positioned to achieve an article diversion from one conveyor runway to another in a pre-selected ratio.

This invention contemplates, as a still further object thereof, the provision of an article conveyor line control device which includes a magnetic rotary turret for selectively diverting articles from a single runway to a plurality of runways in a pre-selected ratio for delivery to filling, sealing or packaging machines or for other subsequent operations.

This invention has, as still another object thereof the provision of an article conveyor line control device of the magnetic rotary turret type generally referred to supra, wherein the location of the magnets may be selectively positioned to achieve an article diversion from one conveyor runway to another in a pre-selected ratio, the magnetic means in this instance comprising a plurality of electro-magnets and means for selectively energizing the electro-magnets.

It is still another object of this invention to provide apparatus of the type referred to supra which is non-complex in construction and assembly, inexpensive to manufacture, and durable in use.

Other and further objects and advantages of the instant invention will become more evident from a consideration of the following specification when read in conjunction with the annexed drawings, in which:

Figure 1 is a top plan view of container divider apparatus constructed in accordance with the present invention;

Figure 2 is a partial side elevational view of the apparatus illustrated in Figure 1;

Figure 3 is a transverse cross-sectional view, partly in elevation, taken substantially on the line 3—3 of Figure 2, looking in the direction of the arrows;

Figure 4 is an exploded perspective view of the permanent magnet assembly for a turret plate;

Figure 5 is a top plan view of container divider apparatus constructed in accordance with a second embodiment of this invention wherein the apparatus is provided with a plurality of electromagnets; and, Figure 6 is a detail cross-sectional view of the embodiment illustrated in Figure 5, Figure 6 being taken substantially on the vertical plane of line 6—6 of Figure 5, looking in the direction of the arrows.

Referring now more specifically to the drawings, reference numeral 10 designates, in general, conveying apparatus constructed in accordance with the teachings of this invention. The apparatus 10 includes a pair of conventionally supported, laterally spaced, parallel and longitudinally extending slides 12, 14 which slidably support the opposed ends of a plurality of elongated substantially rectangular article supporting slats 16 disposed in laterally spaced, side-by-side relation relative to each other. To each of the slats 16, adjacent each end thereof, is secured the bight 18, of a depending, inverted, substantially U-shaped connector element 20, from the opposed ends of which depend the side arms 22, 24, respectively.

Reference numeral 26 denotes a pair of elongated endless conveyor drive chains driven by conventional means. Selected links 28 thereof are connected to the side arms 22, 24 by means of pins 30. Thus, as the chains 26 are driven the slats 16 will move in a corresponding direction.

Reference numeral 32 connotes a pair of substantially rectangular identical standards each of which comprise an elongated main body portion 34 terminating at its opposed ends in lips 36, 38 offset with respect to the main body portion in opposite directions. At pre-selected positions along the length of the conveyor the lips 36 are secured, in longitudinally spaced relation, to a flange 40 integral with and depending from the outer marginal edge of the slide 14. Any conventional means may be utilized in connecting the lips 36 with the flange 40 as, for example, the bolts 42 and nuts 44.

As is seen in the drawings, the main body portions 34 of the standards 32 diverge upwardly and away from the slide 14, and the lips 38 at the other ends of the main body portions 34 are disposed substantially perpendicular to the slide 14.

An elongated substantially rectangular mounting plate 46 extends between and has its respective ends secured to the lips 38 by means of bolts 48 and nuts 50. A pair of vertically spaced and aligned identical bearings 52, of conventional construction, are secured to the mounting plate 46 by means of the bolts 54 and nuts 56. A shaft 58 has its upper end journalled for rotation within the bearings 52 and downward displacement thereof relative thereto is prevented by means of a pair of collars 60 which are secured on the shaft 58 by set screws 62 for rotation therewith, the collars 60 abutting against the upper ends of the bearings 52. The lower end of the shaft 58 is received within an axially extending elongated bore 64 which extends through a substantially cylindrical hub 66 having a pair of vertically spaced integrally formed radial flanges 68, 70, the flanges 68, 70 being disposed, respectively, adjacent each end of the hub 66. The shaft 58 is provided with an axially extending keyway (not shown) adapted for alignment with an axially extending keyway 72 cut through the hub 66, the keyways slidably receiving therein a key 74 held against displacement by means of a set screw 76. Thus, the hub 66 is keyed for rotation with the shaft 58.

Reference numerals 78 indicate a pair of identical substantially solid cylindrical turret plates having centrally positioned transversely extending bores 80, and the circumferential sides thereof are formed with a plurality of arcuately shaped recesses 82. The uppermost one of the turret plates 78 is telescoped over the upper end of the hub 66 and is supported on the upper side of the flange 68 to which it is fixedly secured by a plurality of countersunk screws 84. In a similar manner, the lowermost one of the turret plates 78 is telescoped over the lower end of the hub 66 and is secured to the underside of the flange 70 by means of a plurality of similar countersunk screws 84. The arcuate recesses 82 of the uppermost one of the turret plates 78 are aligned with the arcuate recesses 82 formed in the lowermost turret plate, and the ends of each adjacent pair of recesses are separated by a plurality of radially extending fingers 86. As is seen in Figure 1, the shaft 58 suspends the turret plates 78 in such a manner that substantially one-half of the plates 78 overhang the slats 16 in vertically spaced relation relative thereto.

Reference numeral 88 denotes a substantially flat horseshoe type permanent magnet having opposed poles 90, 92 and a central opening 94. The ends of the poles are formed with arcuate faces 96, 98 cut on the same radius used in forming the arcuate recesses 82.

A fibrous washer 100 extends across one side of the magnet 92 and is provided with an arcuate cutout portion 102 and a transversely extending substantially centrally located aperture 104. The cutout 102 is struck on the same radius of curvature as are the arcuate faces 96, 98.

A substantially rectangular brass plate 106 extends across that side of the washer 100 remotely disposed with respect to the magnet 88, the plate 106 having an arcuate cutout portion 108 extending inwardly from a side thereof, the cutout 108 being struck on the same radius of curvature as are the arcuate faces 96, 98 of the poles 90, 92. The plate 106 is also provided with a transversely extending, centrally located aperture 110.

The magnets 88, washer 100 and plate 106 are assembled in the manner described with the arcuate faces 96, 98 of the magnets being aligned with the arcuate cutout portions 102, 108, and the assembled elements are secured to the underside of the uppermost turret plate 78 by means of an elongated screw 112 which passes through the apertures 104, 110 and between the poles 90, 92 for threaded engagement with a tapped opening 114 disposed adjacent selected ones of the arcuate recesses 82.

A similar assembly of magnets 88, washers 100, and plates 106 are secured to the upper side of the lowermost turret plate 78 adjacent the recesses 82 formed therein which are aligned with the selected ones in the uppermost turret plate 78.

In the drawings, the magnets 88 are secured to both turret plates 78 adjacent every other arcuate recess 82, but as will become apparent below, other variations in the selective placement of the magnets 88 may be utilized.

Reference numeral 116 denotes one of a plurality of brackets. Each of the brackets is seen to comprise an elongated substantially flat rectangular main body portion 118 having lips 120, 122 offset in opposite directions. The lips 122 are fixedly secured at longitudinally spaced intervals to a longitudinally extending flange 124 with the main body portions 116 inwardly inclined over adjacent end portions of the slats 16, the lips 120 being disposed substantially perpendicular thereto. The brackets 116 have secured to their respective lips 120 an elongated substantially rectangular guide member 126 to which is secured, by conventional means, an elongated substantially rectangular leaf spring 128 juxtaposed with respect to the turret plates 78. The guide member 126 extends substantially the entire length of the conveyor 10.

A second elongated substantially rectangular guide member 130 extends longitudinally of the conveyor 10 in laterally spaced substantially parallel and confronting relation relative to the guide member 126, the guide member 130 being located adjacent the loading end A of the conveyor 10 and having an inner terminal end 132 disposed adjacent the turret plates 78.

A third elongated substantially rectangular guide member 134 extends longitudinally of the conveyor 10 in laterally spaced substantially parallel and confronting relation relative to the guide member 126, the guide member 134 being located adjacent the discharge end B of the conveyor 10, the guide member 134 having an inner terminal end 136 disposed adjacent the turret plates 78.

A fourth elongated substantially rectangular guide member 138 extends longitudinally of the conveyor 10 in laterally spaced parallel and confronting relation relative to the third guide member 134 and is located on that side thereof remote from the guide member 126. The guide member 138 has an inner terminal end 140 located adjacent the turret plates 78 and is disposed adjacent the discharge end B of the conveyor 10.

The space between the guide members 126, 130 and between the guide members 126, 134 is substantially equal to the space between the guide members 134, 138, and this dimension is sufficiently large enough to permit cans or other articles 142 formed of a magnetizable material to pass between each adjacent pairs of guide members.

Reference numeral 144 connotes a drag brake having an elongated substantially rectangular central section 146 which terminates at one of its ends in an arcuate tab or brake drum 148. The brake drum 148 frictionally engages partially around the shaft 58. The other end of the central section 146 terminates in a hinge barrel 149 interposed between a pair of hinged barrels 150, 152 integrally formed on a hinge plate 154. Conventional means 156 secure the hinge plate 154 to the mounting plate 46. A pintle pin 158 extends through the barrels 148, 150 and 152 to pivotally connect the brake 144 to the plate 154. The brake drum 149 is held in frictional engagement against the shaft 58 by means of a helicoidal spring 160 under compression which is introduced between the mounting plate 46 and the central section 146 of the brake 144.

In operation a plurality of cans or other articles 142 formed of a magnetizable material are loaded in single file on the slats 16 at the loading end A of the conveyor 10 between the guide members 126 and 130 in longitudinally spaced relation as is shown in Figure 1. The slats 16 move the cans 142 towards the turret plates 78. As one of the cans 142 shown in dotted lines in Figure 1 passes beyond the inner end 132 of the guide member 130 it begins to enter one of the arcuate recesses 82. Continued forward movement of this can or article 142 causes it to engage the resilient leaf spring 128 which then presses the can 142 firmly into the juxtaposed arcuate recess 82, as shown in full lines in Figure 1.

Prior to the operation and loading of the conveyor apparatus 10, the operator predetermines the ratio of distribution of the cans 142 at the discharge end B of the conveyor between the two pairs of guide members 126, 134 and 134, 138, respectively. To that end, one or more magnets 88 are secured to the upper end lower turret plates 78 in the manner described above adjacent one or more of the arcuate recesses 82. In the embodiment shown in Figure 1, the magnets 88 are illustrated as being connected adjacent every other one of the arcuate recesses 82 in both turret plate 78 to obtain, as will be explained below, a distribution ratio of 1 to 1. It should be obvious, however, that by changing the location of the magnets 88 relative to each other and by using more or less thereof, the distribution ratio and the delivery timing at the discharge end B may be selectively varied.

Referring now again to Figure 1 of the drawings, the can 142 shown in full lines has entered a pair of turret recesses 82 adjacent which have been secured the magnets 88. As the conveyor 10 continues its movement, the turret plates 78 rotate in a counterclockwise direction gradually sliding the can 142 across the slats 16 in a curvilinear path until it is substantially aligned between the guide members 134, 138 as illustrated in Figure 1. Further rotation of the plates 78 causes the can 142 to strike against the guide member 138 adjacent its terminal end 140 to break the magnetic field of attraction between the magnets 88 and the can 142. The can 142 now moves on the slat 16 between the guide members 134, 138.

The can 142 shown in phantom lines just preceding the full line illustration thereof in Figure 1 is received within the next succeeding recesses 82 formed in the upper and lower turret plates 78, and since no magnets are mounted adjacent thereto, the can 142 is released therefrom for continued linear movement between the guide members 126, 134.

From the foregoing specification it should now be apparent that the turret plates 78 are only rotated when a can 142 enters the recesses 82 formed therein and engages against the leading one of the fingers 86 disposed at opposite ends thereof.

Figures 5 and 6 illustrate a second embodiment of this invention which is similar to that illustrated in Figures 1 to 4, inclusive, with the exception of the substitution of electromagnetic means for the permanent magnetic means for effecting the selective diversion of the conveyed articles from a single conveyor runway to a plurality of runways.

In this second embodiment of the invention parts thereof having counterparts in the first embodiment are differentiated therefrom by the addition of a prime mark to the identical reference numeral.

The second embodiment of the invention includes a conveying apparatus 10' and a pair of conventionally supported, laterally spaced, parallel and longitudinally extending slides 12', 14' and intermediate slides 200, 202, 204, the slides being adapted to slidably support the opposed ends of a plurality of elongated substantially rectangular article supporting slats 206, 208, 210 and 212 disposed in side-by-side and end-to-end relation relative to each other. The chain drives 28' are synchronized or connected together so that the slats move longitudinally on the conveyor at a uniform rate of speed.

As in the preceding embodiment, upper and lower turret plates 78' are secured to a shaft 58' for rotation therewith. However, in this modification, electro-magnets 214 have been substituted for the previously described permanent magnets. As is seen in Figure 6, the electro-magnets 214 are secured to the adjacent sides of the turret plates 78' proximate selected ones of the arcuately shaped recesses 82' by means of brackets 216 and screws 218.

To serve a function to be described, the uppermost one of the turret plates 78' is formed with a plurality of radially and inwardly spaced bores 220 (one for each recess 82'), the inward spacing differing in substantially equal increments from each other and with the radial spacing between each adjacent pair thereof being substantially equal. The bores 220 are each counterbored at 222.

Reference numeral 224 designates an electrically conductive brush having an enlarged cylindrical contact head 226 and a stem 228 of reduced diameter, the latter being mounted for reciprocation in the counter bore 222 and extending transversely on each side thereof. A helicoidal spring 230 is seated within the bore 220 and surrounds a portion of the stem 228. The upper end of the spring 230 engages against the radial flange 232 carried on the stem 228 adjacent the head 226. A substantially cylindrical cap 234 having a centrally apertured end wall 236 is fitted over the head 226, and the open end of the cap 234 is formed with a radial flange 238 fixedly secured to the upper side of the uppermost one of the turret wheels 78'. As is clearly seen in Figure 6, the stem 228 is secured to one end of a radially projecting arm 240 to which one side of the electro-magnet 214 is connected through wire 242; the other side of the electro-magnet 214 is grounded to the hub 66' through wire 244.

The arm 240 is connected to one side of the electro-magnet 214 on the lower turret wheel 78' immediately below the previously described electro-magnet, through the wire 246; the other side of the lower electro-magnet 214 is grounded to the hub 66' through the wire 248.

Reference numeral 250 denotes, generally, an L-shaped bracket having the leg 251 thereof fixedly connected to the mounting plate 46' by bolts 252 and 254. The foot portion 256 is connected at 258 to a substantially flat cylindrical disc 260 formed of a dielectric material and constructed, preferably, of a dielectric plastic. The plate 260 is centrally apertured at 262 and surrounds the shaft 58' proximate the bearing 52'.

As is seen in Figures 5 and 6, the circumferential side wall of the disc 260 is provided with a cutout to receive therein a plurality of metallic inserts 264, 266, 268, preferably formed of copper or of other materials having good electrical conductivity characteristics, the inserts being secured to the disc 260 by means of a plurality of radially spaced screws 270. If desired, the inserts 264, 266, 268 may be constructed as an integral unit.

As is clearly seen in Figure 6, the disc 260 is subtended from the mounting plate 46' in such a manner as to effect wiping or sliding engagement of the enlarged bush heads 226 against the inserts 264, 266, 268 at periodic intervals.

As is seen in Figure 5 of the drawings, a metallic plate 272 is fixedly secured to and extends across adjacent ends of the inserts 264, 266, 268 and is electrically connected through wire 274 with one side of the secondary of a transformer 276. The transformer 276 is of the voltage step down type and the other side of the secondary is grounded to the mounting plate 46' through the wire 278. The primary winding of the transformer 276 is energized through a conventional wire cable 280 which is connected thereto from a source of suitable E.M.F. through a toggle switch 282.

For convenience, the cans 142 formed of magnetizable material described above in connection with the first embodiment of this invention are here identified by the same reference numeral to which has been added reference letters A, B, C, and D, and a second series of cans or containers 142A', 142B', 142C' and 142D'. Adjacent pairs of conveyor guide members 284, 286, and 286, 288, and 288 and 290 and 290, 292 define therebetween a plurality of conveyor discharge flights for the slats 206, 208, 210 and 212, respectively.

Assuming that the conveyor apparatus 10' is in operation and the slats are moving in the direction indicated by the arrows, and further assuming that the switch 282 is closed, the operation of the device is as follows.

A plurality of containers or other receptacles formed of a magnetizable material, 142A, 152B, 142C and 142D are loaded in single file on the slats 206 at the loading end of the conveyor 10'. As the same move towards the discharge end of the conveyor they are intercepted by turret wheels 78' and are pressed into one of the upper and lower pairs of receiving recesses 82' by the leaf spring 128' in the manner previously described. In the embodiment of the invention illustrated in Figures 5 and 6, three successive pairs of recesses 82' have been equipped with electro-magnets 214 while the recesses 82' at each end thereof are not. This sequence is carried out over the entire circumference of the turret plates 78'.

In Figures 5, all three of a given series of brushes or heads 226 are shown as wiping against or engaging the inserts 264, 266 and 268 thereby energizing their respective connected electro-magnets. The turret plates 78' rotate in a counterclockwise direction and the container or receptacle 142A is pressed into one of the pair of upper and lower recesses 82' having proximate thereto a pair of upper and lower energized electro-magnets 214. This container is held in the recess 82' as the turret wheels 78' rotate substantially thirty degrees to bring the next succeeding pair of recesses 82' in opposition to the spring 128' with the container 142B. Since the electro-magnets 214 associated with this second pair of upper and lower recesses 82' are now energized, the container 142B will rotate thirty degrees with the turret wheels 78', and the container 142A will rotate a similar distance. At the same time the container 142C moves into juxtaposition with respect to a third pair of upper and lower recesses 82' having a third pair of energized electro-magnets 214 associated therewith and will be held therein for another thirty degrees rotation of the turret wheels 78'. The fourth container 142D is now moved into juxtaposition between the spring 128' and a fourth pair of upper and lower recesses 82' which are not equipped with the electro-magnets, and as the turret plates 78' continue to rotate the containers 142A, 142B, 142C and 142D reach the positions indicated at 142A', 142B', 142C' and 142D'. At these last named positions, the three brushes or heads 226 have just escaped from beneath the inserts 264, 266 and 268 to effect de-energization of the magnets holding the containers 142A', 142B' and 142C' to the turret wheels 78'. The now released containers 142A', 142B' and 142C' are now free for conveyance by the slats 212, 210 and 208, respectively, to their respective discharge stations and the container 142D' is free to follow the conveyor slat 206 to its eventual discharge point. This operational sequence is then repeated.

As is evident from the above description, the electro-magnets 214 may be arranged in any predetermined position to obtain the desired distribution ratio.

Having described and illustrated in detail two embodiments of the instant invention, it will be understood that the same are offered merely by way of example, and that the inventions are to be limited only by the scope of the appended claims.

What is claimed is:

1. Conveyor apparatus for diverting articles formed of a magnetizable material travelling in a given path to a second path of travel pre-selected from a plurality of other paths of travel, said apparatus including rotatable article diverting means having at least one electro-magnet mounted thereon, said means being disposed intermediate the ends of said given path of travel of said articles for the interception thereof, means for energizing said electro-magnet to attract to said rotatable article diverting means one of said articles, and means on said rotatable article diverting means for de-energizing said electro-magnet for positioning said article in said pre-selected one of said plurality of paths of travel.

2. Conveyor apparatus for diverting articles formed of a magnetizable material travelling in a given linear path to pre-selected ones of a plurality of linear paths of travel, said apparatus including rotatable article diverting means disposed intermediate the ends of said given linear path of travel of said articles for the interception thereof, a plurality of electro-magnets connected to said means for rotation therewith, means for energizing said electro-magnets, said energized electro-magnets attracting and releasably holding said articles to said means for rotation therewith and means for de-energizing said electro-magnets when said articles are moved into any one of said pre-selected plurality of paths of travel.

3. Conveyor apparatus for diverting selected articles formed of magnetizable material from an original path of travel to pre-selected ones of a plurality of paths of travel, said apparatus including a plurality of longitudinally spaced substantially parallel slats forming the loading and discharge ends of said conveyor apparatus, means for effecting movement of said slats towards said discharge end of said conveyor apparatus, a pair of vertically spaced and substantially parallel cylindrical turret plates journalled for concurrent rotation, said plates at their circumferential sides having a plurality of arcuate recesses formed therein with said recesses of one of said plates being aligned with said recesses formed in the other of said plates, a plurality of electro-magnets, means for selectively securing one or more of said electro-magnets to said plates adjacent pre-selected ones of said recesses, means for selectively energizing said electro-magnets, means for supporting said plates in overhung vertically spaced relation relative to said slats, a plurality of substantially rectangular guide members disposed in laterally spaced relation relative to said slats and disposed adjacent the discharge end of said conveyor apparatus, said articles being fed to the loading end of said conveyor apparatus for movement towards and for reception in said arcuate recesses, said articles disposed within said recesses having electro-magnets energized immediately adjacent thereto being slidable across said slats, means for de-energizing said electro-magnets when said articles have been moved to their respective pre-selected discharge paths of travel for passage to the discharge end of said conveyor.

4. Conveyor apparatus for diverting pre-selected articles formed of magnetizable material from an original path of travel to pre-selected ones of a plurality of paths of travel as defined in claim 3, wherein said means for energizing and de-energizing said electro-magnets comprise a plurality of metallic members, means for supporting said metallic members in elevated position above said turret plates, means for connecting one side of a source of E.M.F. to said metallic members, means grounding the other side of said E.M.F. source to said apparatus, and a plurality of electrically conductive brushes mounted for reciprocation in one of said turret plates and adapted to slidably engage said metallic members, said brushes being electrically connected with one side of said electro-magnets, means connecting the other side of said electro-magnets to said ground through said conveyor apparatus, said electro-magnets being energized by engagement of said brushes with the trailing end of said metallic members and de-energized upon disengagement of said brushes from the leading ends of said metallic members.

5. Conveyor apparatus as defined in claim 4, wherein said metallic members are arcuately shaped and fixedly secured to a dielectric disc, and means constantly urging said brushes into engagement with said arcuately shaped metallic members.

References Cited in the file of this patent

UNITED STATES PATENTS

| 2,630,903 | Currivan | Mar. 10, 1953 |
| 2,770,349 | Nordquist | Nov. 13, 1956 |
| 2,787,359 | Gerecke | Apr. 2, 1957 |